United States Patent

Leimbach et al.

[11] Patent Number: 5,934,433
[45] Date of Patent: *Aug. 10, 1999

[54] FRICTION CLUTCH HAVING AN ACTUATOR FOR AUTOMATED OPERATION

[75] Inventors: Lutz Leimbach; Erwin Bair, both of Grafenrheinfeld; Reiner Voss, Maibach; Heiko Schulz-Andres, Reinfeld, all of Germany

[73] Assignee: Fichtel & Sachs AG, Schweinfurt, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/822,113

[22] Filed: Mar. 21, 1997

[30] Foreign Application Priority Data

Mar. 21, 1996 [DE] Germany ............ 196 11 183

[51] Int. Cl.⁶ .................................................. F16D 19/00
[52] U.S. Cl. ......................... 192/93 A; 192/20; 192/84.6
[58] Field of Search ................... 192/20, 93 A, 192/84.6, 84.7, 84.9; 475/150; 74/567

[56] References Cited

U.S. PATENT DOCUMENTS

| | | | |
|---|---|---|---|
| 2,786,561 | 3/1957 | Parrett | 192/93 A |
| 2,897,994 | 3/1959 | Tiedman et al. | 192/93 A |
| 4,016,957 | 4/1977 | Osujo et al. | 192/93 A X |
| 4,677,877 | 7/1987 | Anderson et al. | 192/93 A X |
| 4,976,347 | 12/1990 | Sakakibara et al. | 192/93 A X |
| 5,106,349 | 4/1992 | Botterill et al. | 192/93 A X |

FOREIGN PATENT DOCUMENTS

| | | |
|---|---|---|
| 43 37 613 A1 | 5/1995 | Germany . |
| 195 10 905 A1 | 10/1995 | Germany . |
| 295 11 623 U1 | 11/1995 | Germany . |

*Primary Examiner*—Charles A. Marmor
*Assistant Examiner*—Saúl J. Rodríguez
*Attorney, Agent, or Firm*—Cohen, Pontani, Lieberman & Pavane

[57] ABSTRACT

An actuator for automated operation of a friction clutch includes a drive that is connected with an input part of a gearing and an output part of the gearing that is movable into operative connection via a transmission member with a disengagement bearing of the friction clutch. The transmission element has a pitch region rotatable for driving an engagement element into force-applying contact with a disengagement bearing for displacing the disengaging bearing and thereby disengaging the clutch.

17 Claims, 8 Drawing Sheets

FRICTION CLUTCH HAVING AN ACTUATOR FOR AUTOMATED OPERATION

BACKGROUND OF THE INVENTION

1. Field of the Invention

The present invention relates to a friction clutch having an actuator for automated operation.

2. Description of the Related Art

An actuator for automated operation of a friction clutch is already known, as for example disclosed in German Utility Model GM 295 11 623.4. In this prior art actuator, an electric motor drives a spur gear which, in turn, drives a segmented gear wheel. A transmission element which acts on a disengagement fork is connected to the segmented gear wheel which in turn is connected to a disengagement bearing of a clutch, and as a result the friction clutch is engaged upon actuation of the actuator.

The object of the present invention is to provide an actuator that is mechanically connected operatively with the disengagement bearing of the friction clutch and may be disposed on or in the clutch housing.

SUMMARY OF THE INVENTION

The present invention relates to an actuator for automated operation of a friction clutch. In accordance with the present invention, the actuator includes a drive that is connected to an input part of a gearing and an output part of the gearing that is brought by a transmission element into operative relation with a disengagement bearing of the friction clutch. The transmission element has at least one region that extends at an axial pitch, hereinafter referred to as the "pitch region", which may be brought into contact with an engagement element.

According to an embodiment of the invention, an actuator for operating a friction clutch includes a stationary clutch housing having an axially extending hub portion, a transmission element including a pitch region and being rotatably movable about the axially extending hub portion, a drive connected to the housing and the transmission element for rotatively moving the transmission element about the axially extending hub portion, a release or disengagement bearing non-rotatably disposed on the axially extending hub portion and axially displaceable away from the clutch housing for disengaging the friction clutch; an engagement element disposed for engagement with the transmission element pitch region and a non-rotating counter-surface, the pitch region being configured to define a predetermined axial pitch such that rotative movement of the transmission element by the drive causes the engagement element to displace the release bearing for disengaging the friction clutch, and wherein the axial pitch is dimensioned so that the transmission element applies a substantially constant actuating force to the release bearing.

The actuator comprises a drive, a transmission element having a region at an axial pitch and an engagement element which may be brought into operative connection with the region. Actuation of the clutch is effected by the drive and transmitted via the transmission element to the disengagement bearing of the clutch. The region of axial pitch of the transmission element is oriented in the direction toward the disengagement bearing when the region is located on that side of the transmission element facing the disengagement bearing. If the region of axial pitch is located on the side of the transmission element facing away from the disengagement bearing, then the pitch has the opposite sign. The engagement element is brought into operative contact with the region of axial pitch, by turning the engagement element with respect to the transmission element, in such a manner that the axial length therebetween is changed. The engagement element or the transmission element is connected to the disengagement bearing to that intended turning or rotation of the region of axial pitch of the transmission element with respect to the engagement element engages or disengages the clutch in a predetermined manner.

The greater the number of couplings, the greater the disengagement path or distance and/or the disengagement force necessary to uncouple the clutch. This problem is solved by dimensioning the actuator to permit actuation of the clutch by the actuator over the entire lifetime of the clutch. In particular, by suitably dimensioning the regions of axial pitch and the drive, the actuator will always be capable of providing the maximum possible disengagement distance or disengagement force necessary to effect the disengagement process.

The necessary disengagement distance or force for the coupling process is preferably kept as small as possible so as to use the smallest possible drive. A transmission element of relatively short axial length is used in order to keep the disengagement distance of the clutch relatively small, and as a result the difference in height of the regions of axial pitch of the engagement element and the transmission element are limited to the disengagement distance. The maximum possible disengagement displacement distance to be axially moved by the actuator is the value of this difference in height. For these reasons, the use of a friction clutch with a device for compensating for wear, such by way of example as that disclosed in German Patent Publication 43 37 613 A1, is advantageous. This device counterbalances for wear-produced increases in the disengagement distance or force necessary for the coupling process so that the force or disengagement distance remains approximately constant. Thus, the actuator need only be capable of providing the initial necessary disengagement distance or force of a friction clutch, i.e. without wear compensation. As a result, the drive and difference in height of the axial pitch may be made correspondingly small. The force necessary to actuate the clutch may be further reduced by including an additional spring in the clutch, as for example disclosed in German Patent Publication 195 10 905. The use of this type of clutch is advantageous in that a drive of less power or a gearing having a different transmission ratio may be employed. Typically, a transmission having a large reduction ratio is provided between the drive and disengagement bearing in order to enable use of a drive of relatively small power in the actuator.

The actuator may be constructed in various ways depending on the particular application or environment. For example, in order to save space, a segmented gear wheel may be used as the output portion of the gearing. Furthermore, the regions of axial pitch may form the output part of the gearing with a structural part of the transmission element integrated into the output part of the gearing. In constructing the actuator, the engagement element may comprise balls that are interposed between the output part of the gearing and the disengagement bearing in a force-locked manner, so that the turning or rotation of the output part of the gearing causes the balls to roll up or down the regions of axial pitch. Alternatively, the balls may be arranged on the side of the transmission element facing away from the disengagement bearing, in which case the axially movable gearing output part is connected to the disengagement bearing and the balls are supported in a force-locked manner between the regions of axial pitch of the transmission element and a friction contact surface. This particular actuator configuration is advantageous in that the slight rolling friction of the balls results in a relatively ready or easy transmission of the actuator power.

In still another arrangement, the engagement element may include reverse-pitch regions, i.e. regions having a pitch opposite in sign to the axial pitch of the regions of the transmission element. The reverse-pitch regions may be located and formed so that they engage the regions of axial pitch of the transmission element or pitch regions. Pitch regions and reverse-pitch regions support each other in a form-locked manner in at least parts of the regions. In order to produce the largest possible contact surface between these elements, it is advantageous to form the regions of axial pitch as planes having a linear pitch so that the planes of the pitch region and reverse-pitch region slide on or against each other. Furthermore, these planes may be formed as paths preferably arranged circularly and coaxially. In this preferred configuration, the engagement element is cylindrically-shaped with one limiting surface of the cylinder having a serrated profile that engages the path profile of the pitch region of the transmission element. As the profiles of the transmission element and engagement element are turned with respect to each other, the axial length of the system changes. This change in axial length is transmitted to the disengagement bearing which, in turn, causes the clutch to engage or disengage.

It is advantageous to arrange at least part of the transmission element, and the gearing of the actuator, in the clutch housing adjoining the disengagement bearing on the side thereof facing away from the clutch. The drive may be fastened to the clutch housing so that the actuator forms a structural unit integral with the clutch.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings wherein like reference numerals represent similar elements throughout the several views.

DETAILED DESCRIPTION OF THE PRESENTLY PREFERRED EMBODIMENTS

Figure 1:
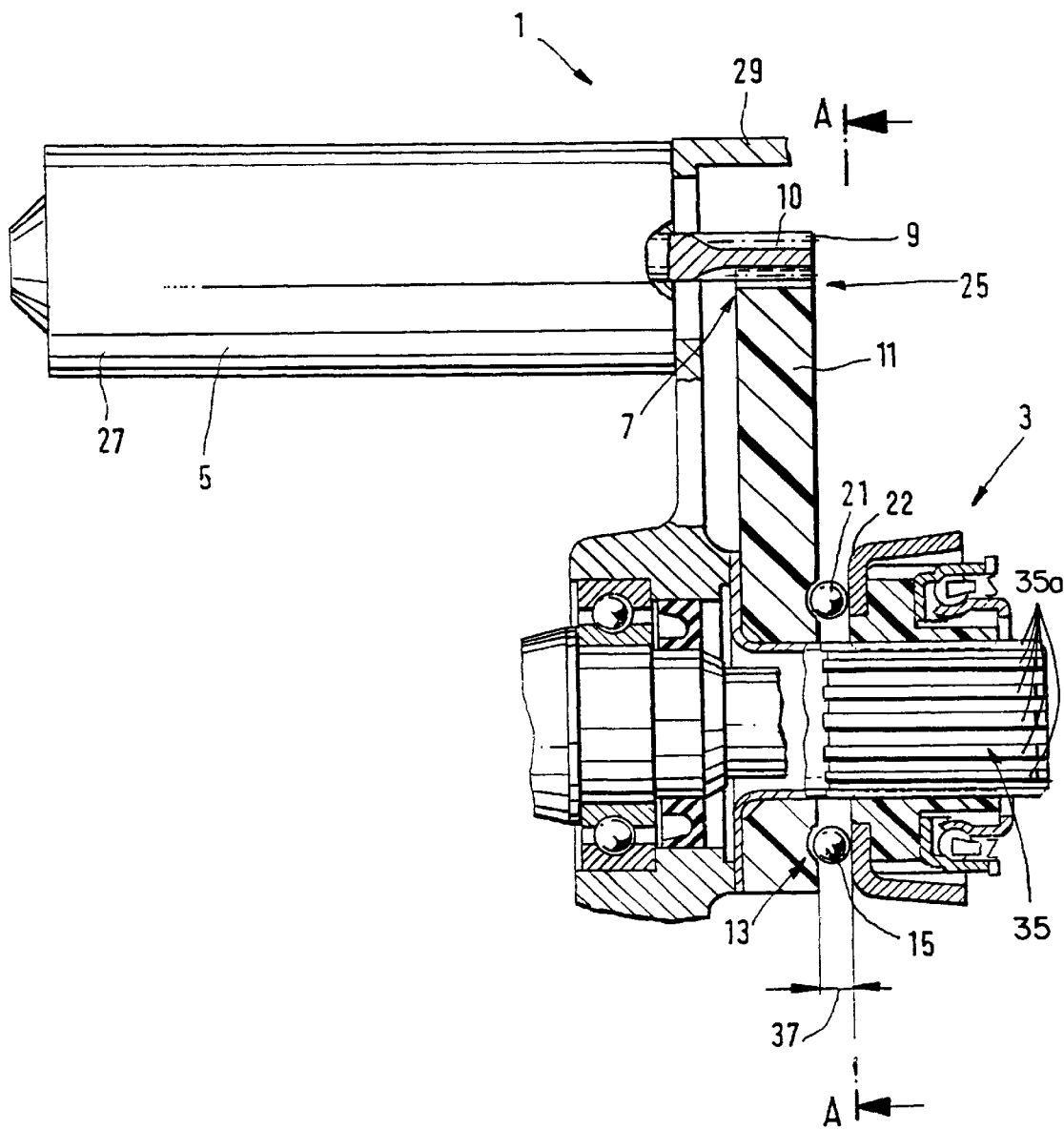
FIG. 1 depicts a first embodiment of the actuator of the present invention with the clutch in its disengaged operational position.
Figure 2:
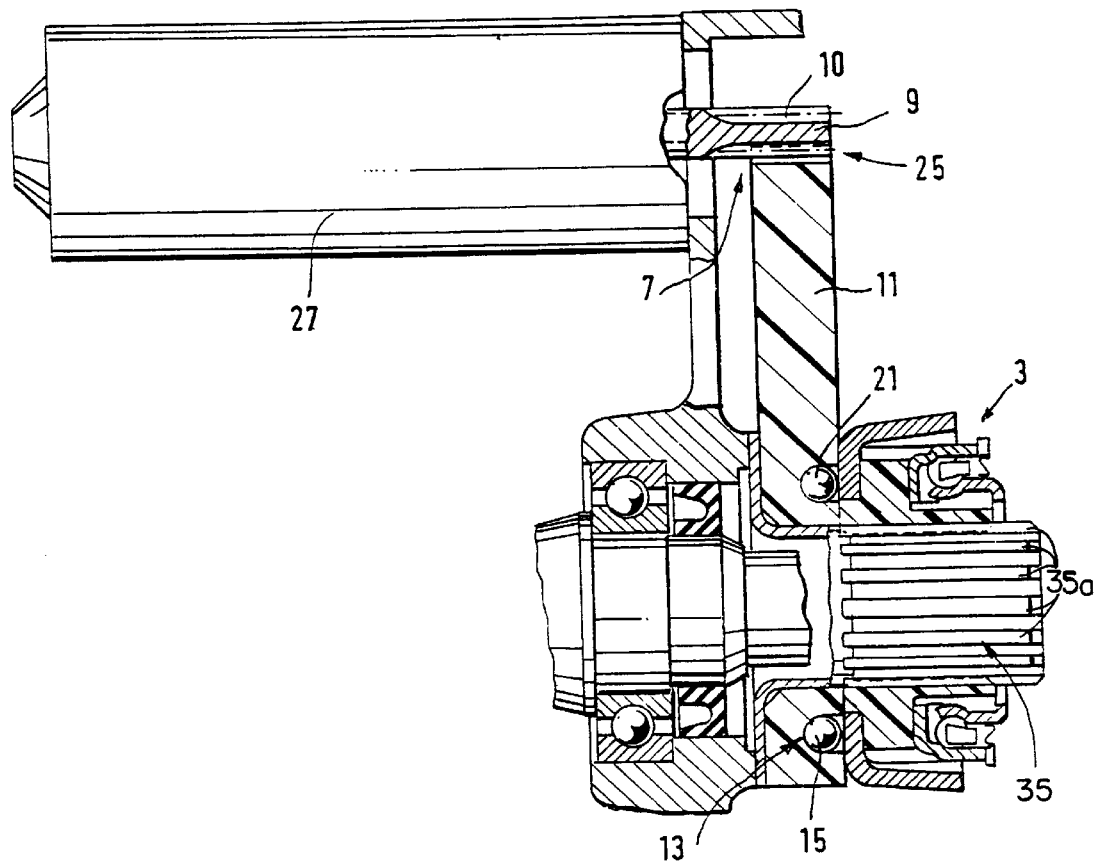
FIG. 2 depicts the actuator of FIG. 1 with the clutch in its engaged operational position.
Figure 3:
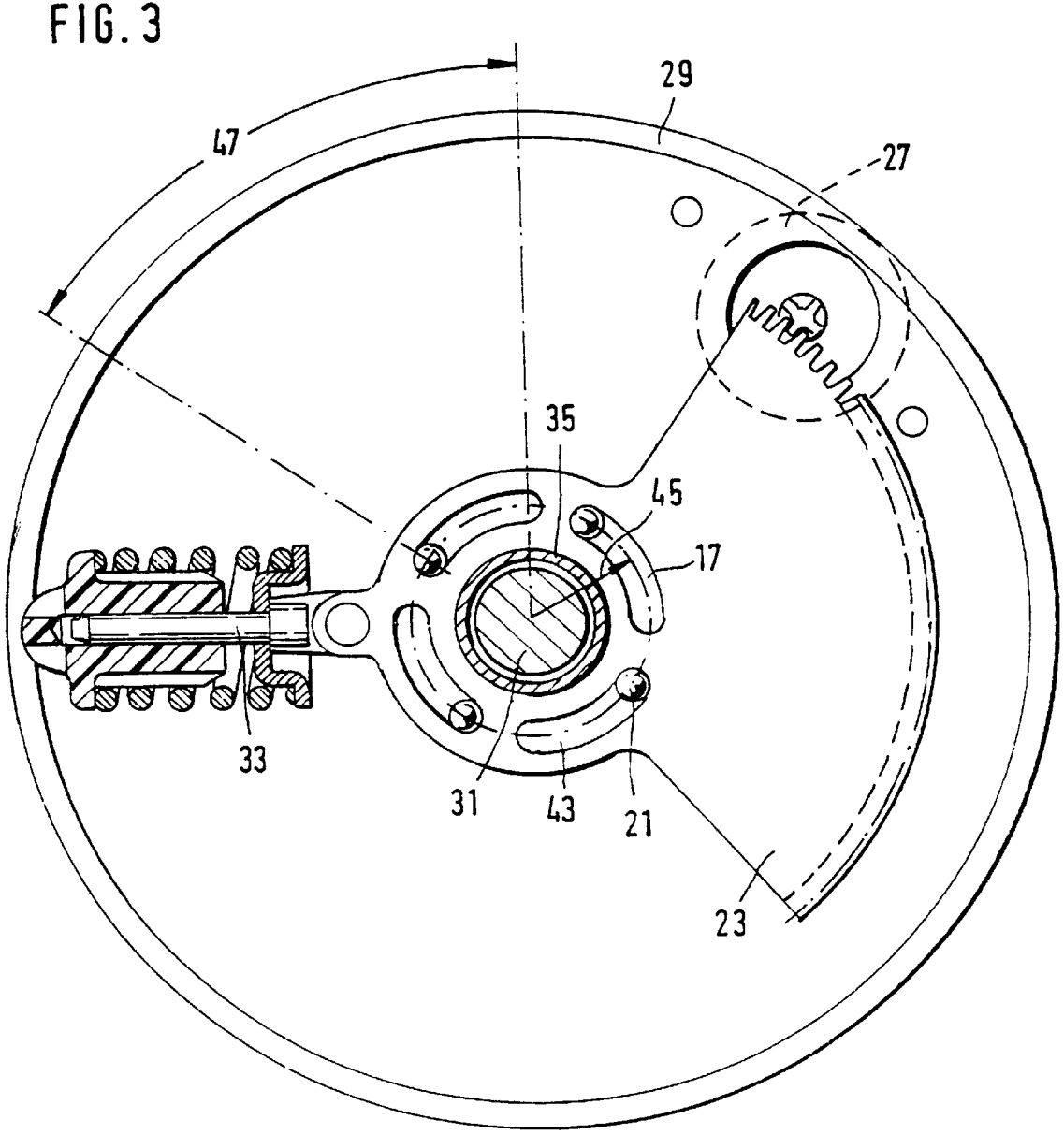
FIG. 3 is a cross-sectional view of the actuator taken along the line A—A in FIG. 1.

FIGS. 1 through 3 show a first embodiment of the actuator 1 of the present invention. Actuator 1 includes a drive 5 which may be fastened or attached to a clutch housing 29 to form a structural or integral unit with the clutch. Drive 5 is an electric motor 27 that drives a spur gear 10 of a gearing 7. Spur gear 10 comprises the input part 9 of a step-down gearing or reduction gear 25 that engages a segmental gear wheel 23 which forms an output part 11 of the gearing. A compensating spring 33 may be interposed between the segmental gear wheel 23 and the clutch housing 29 to allow for lateral movement. In the gearing output part 11, regions with an axial pitch ("pitch regions") 17 comprise an integral part of a transmission element 13, in that the pitch regions 17 are integral with the segmental gear wheel 23. In the illustrative example shown in FIG. 3, four paths 43 form a circle of approximately constant radius 45 on the side facing the disengagement or release bearing 3. Each path 43 has an associated or corresponding ball 21 that is connected in a force-locked manner with the non-rotating countersurface 22 of disengagement bearing 3 on the side opposite the pitch regions 17. As shown in FIG. 2, when the clutch is engaged the balls 21 are recessed in the segmental gear wheel 23. The clutch is operated by actuating the electric motor 27 which, in turn, drives the spur gear 10 to cause the segmental gear wheel 23 to rotate through an angle 47 about a gearing input shaft 31 as the axis of rotation. Gearing input shaft 31 is surrounded by a hub-portion such as a guide sleeve 35 attached to the clutch housing 29. As shown in FIG. 1, the disengagement bearing 3 is rotatably fixedly mounted on splines 35a on the guide sleeve 35 and is axially displaceable thereon. The balls 21 travel along the paths 43 and thus provide movement in the axial direction, for example, in the direction towards the disengagement bearing 3. The balls 21 transmit this axial movement to the disengagement bearing 3, as a result of which the clutch is disengaged after being displaced axially a distance 37 as shown in FIG. 1.

Figure 4:
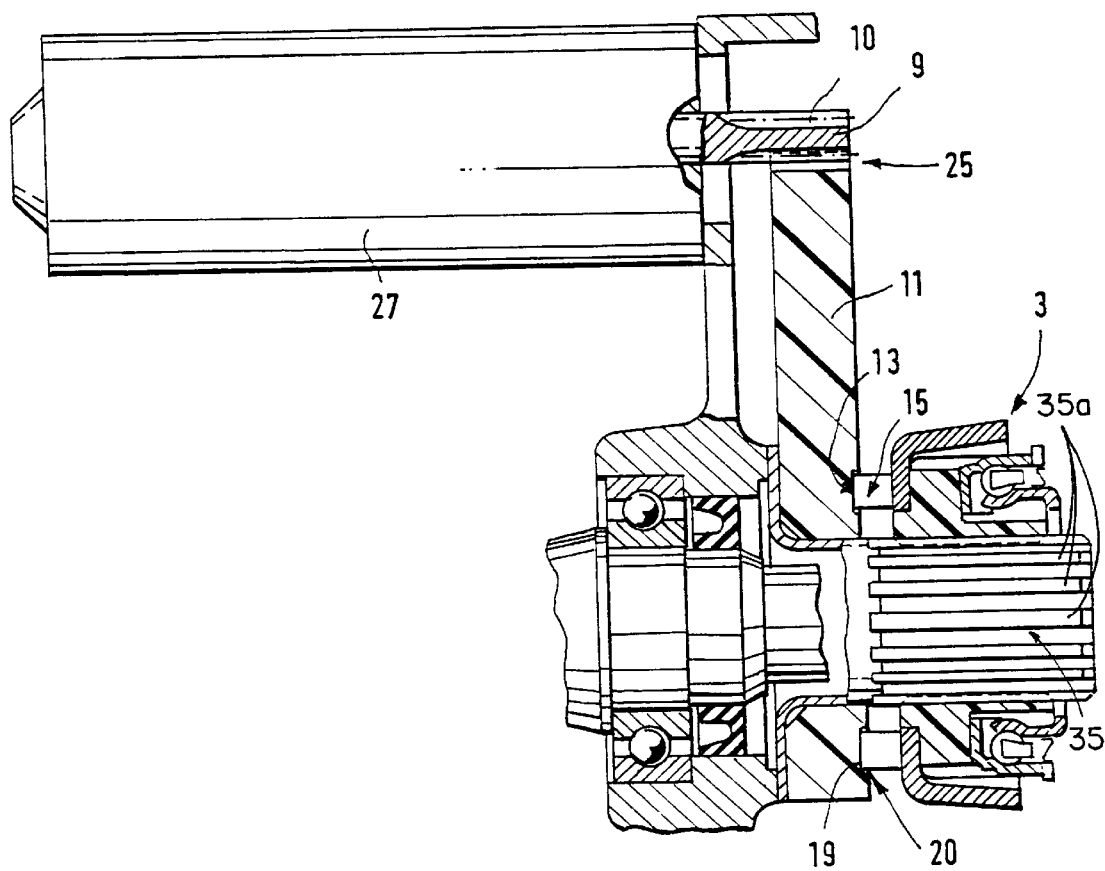
FIG. 4 depicts a second embodiment of the actuator of the present invention with the clutch in its disengaged operational position, the actuator being configured with the transmission and engagement elements comprising oblique planes which rotate in contact with one another.
Figure 5:
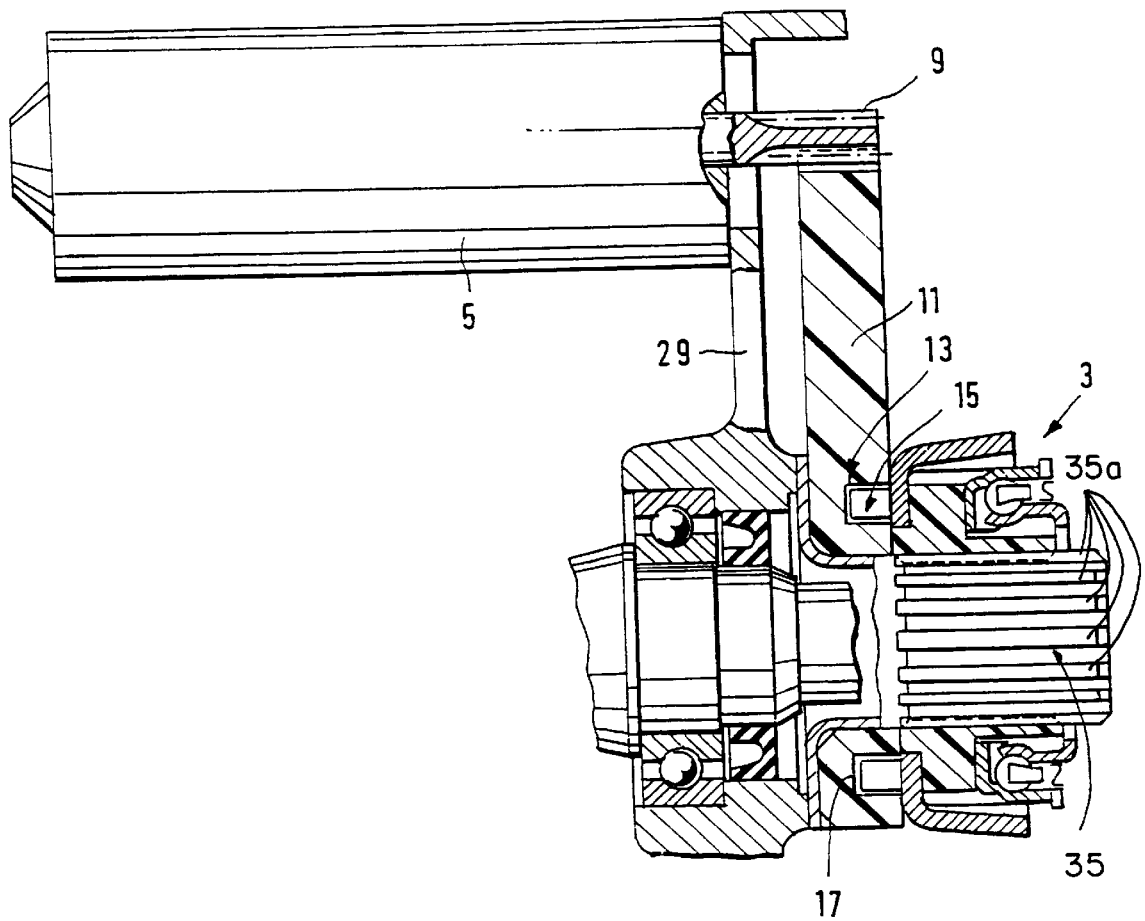
FIG. 5 depicts the actuator of FIG. 4 with the clutch in its engaged operational position.
Figure 6:
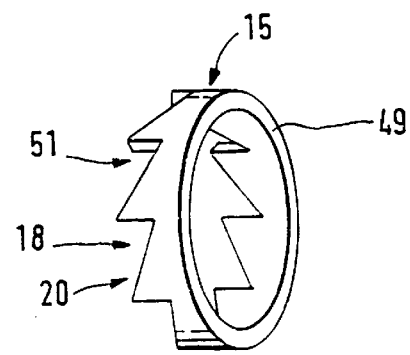
FIG. 6 depicts a perspective view of the engagement element of FIG. 4.

FIGS. 4 through 6 show a second embodiment of an actuator 1 constructed in accordance with the invention with an alternative configuration transmission element 13 and of the engagement element 15. In the second embodiment, the transmission element 13 comprises inclined planes 19 arranged on a circle of approximately constant radius 45 and having a pitch in the direction of or toward the disengagement bearing 3. The engagement element 15, as shown in FIG. 6, engages or meshes into these regions 19. Specifically, engagement element 15 is preferably cylindrically-shaped and, on its side facing the disengagement bearing 3, comprises a substantially smooth surface 49 that is approximately parallel to the bearing and is operatively connected to the disengagement bearing 3 so as to be approximately fixed for rotation. The side of the engagement element 15 facing away from the disengagement bearing 3 comprises a reverse-pitch region 18 formed by a limiting surface 51 comprising oblique planes 20 so that the engagement element 15 is in engagement bearing with the regions 19 of the transmission element 13, which also comprise oblique planes. As the segmental gear wheel 23 is driven, the orientation of the planes 19 of the transmission element 13 is changed with respect to the planes 20 of the engagement element 15. The contact surfaces of the planes 19, 20 slide against each other, as a result of which the axial length of the system varies. This change in length is transmitted to the disengagement bearing 3 and, as a result, axially displaces the disengagement bearing 3 to thereby control the engagement and disengagement process. If the axial length of the transmission element 13 is increased, then the disengagement bearing produces an axial movement in the direction of the clutch which results in disengagement. The remaining elements and manner of operation correspond to that of the actuator described with reference to FIGS. 1 through 3.

Figure 7:
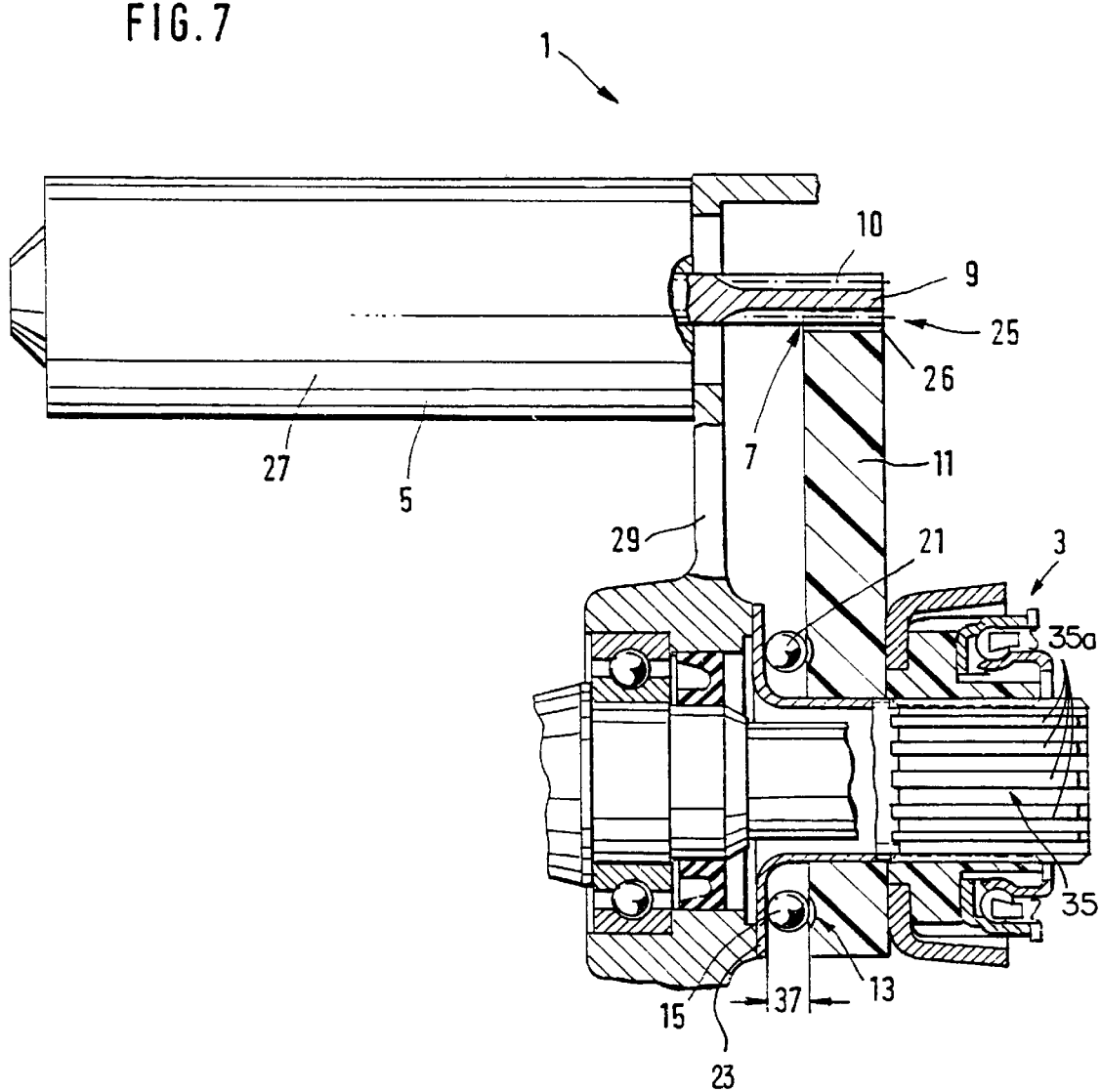
FIG. 7 depicts a third embodiment of the actuator of the present invention with the clutch in its disengaged operational position, the actuator being configured with the transmission and engagement elements arranged on the side of the gearing output part facing the clutch.
Figure 8:
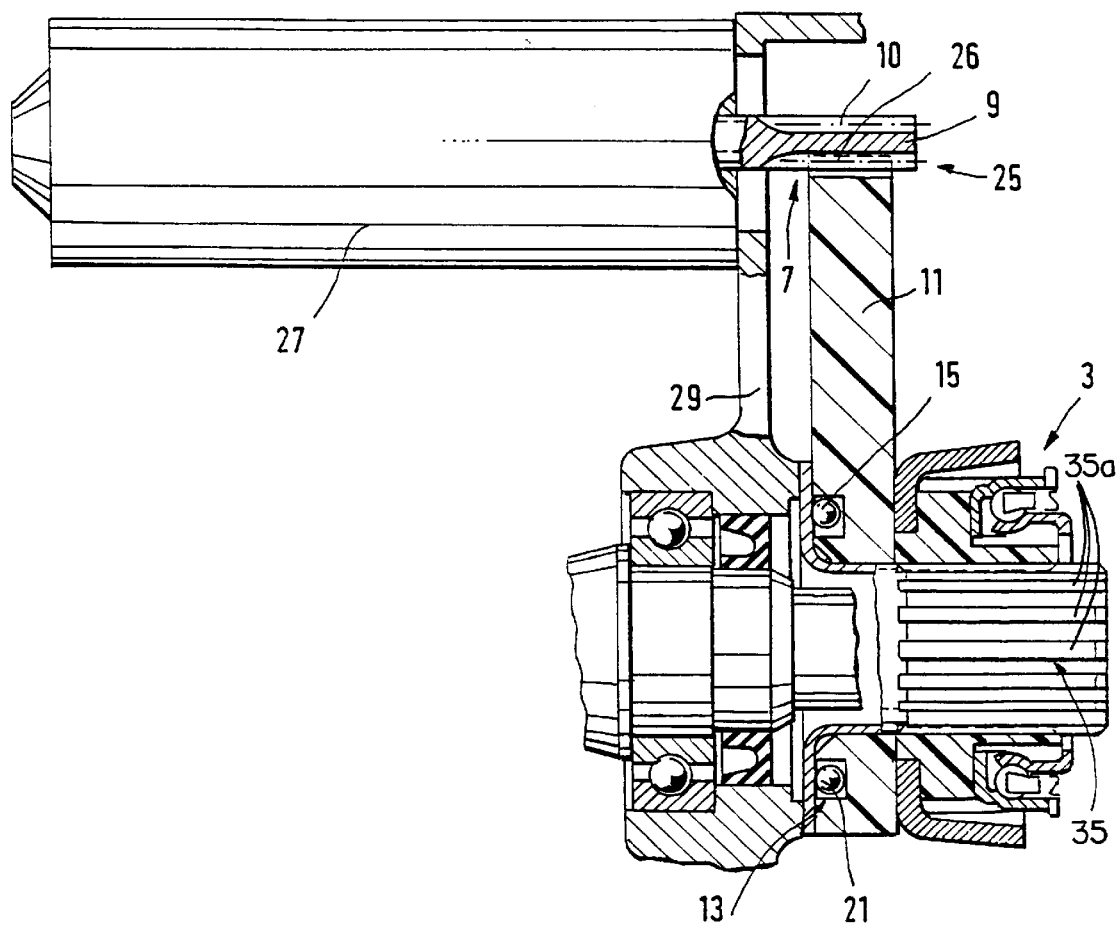
FIG. 8 depicts the actuator of FIG. 7 with the clutch in its engaged operational position.

In a third embodiment of an actuator constructed in accordance with the invention, as shown in FIG. 7 and 8, the transmission element 13 and the engagement bearing element 15 are arranged on the side of the gearing output part 11 facing away from the clutch. In this embodiment, the engagement element 15 is connected in a force-locked manner between the transmission element 13 and a countersurface 23. Gearing output part 11 is mounted for axial movement and is driven by the gearing input part 9 via a toothing 26, preferably a helical toothing. The pitch regions are developed in the gearing output part 11 coaxially on the side facing away from the clutch. As the gearing output part 11 is driven, orientation of the pitch regions 17 with respect to the engagement element 15 is changed. The transmission element 13 may configured in any one of the embodiments shown in FIGS. 1 and 4. The axial length of the transmission element 13 is varied by a change in the orientation of pitch region 17 with respect to reverse-pitch region 18, as a result of which the gearing output part 11 is displaced in the axial direction. The axial movement of the gearing output part 11 is transmitted to the disengagement bearing connected with it on the side facing the clutch so as to engage and disengage the clutch.

Figure 9:
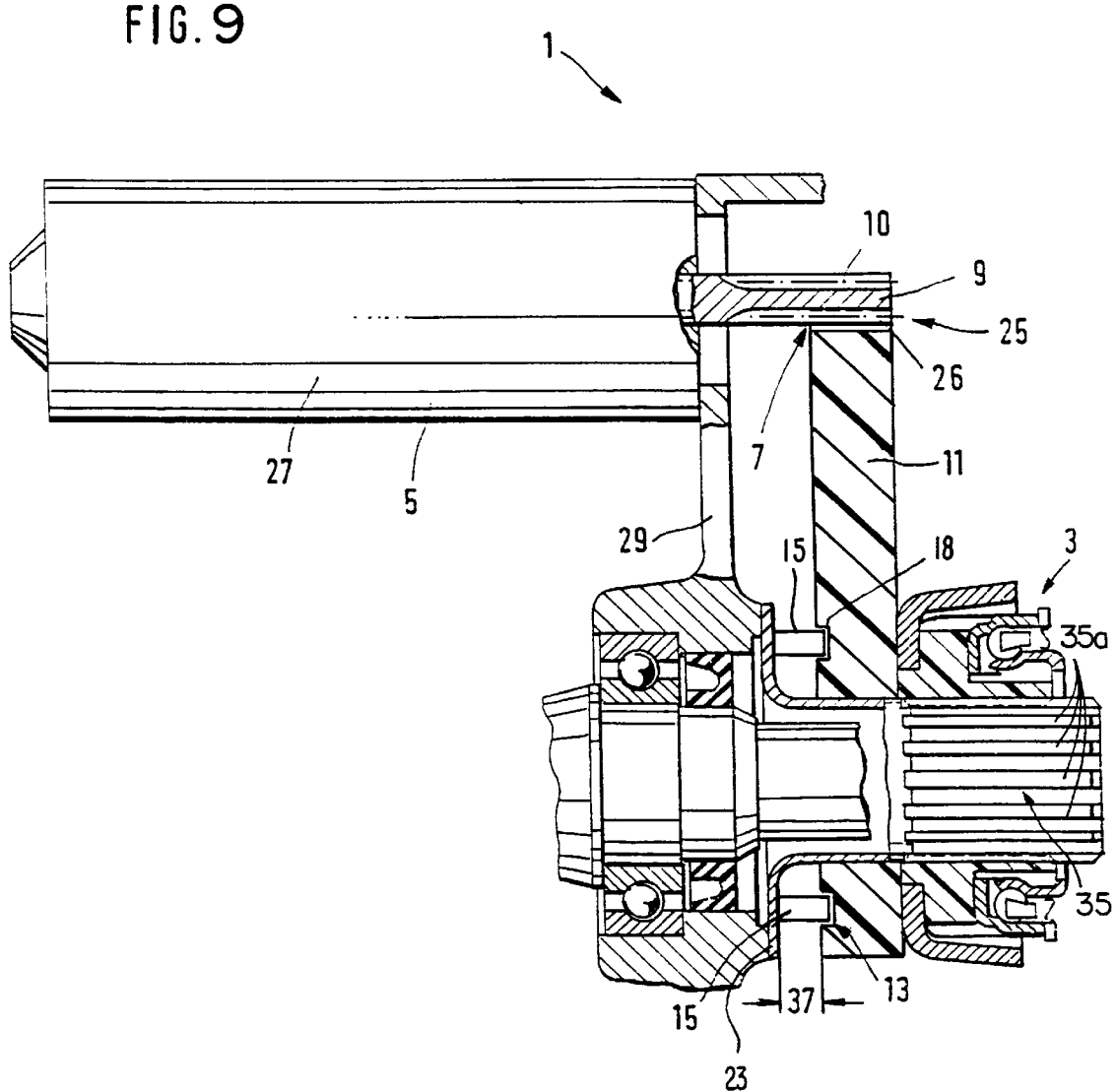
FIG. 9 depicts a fourth embodiment of the present invention with the transmission and engagement elements disposed in the positions shown in FIG. 7 and having oblique planes which rotate in contact with one another.

Referring to FIG. 9, the engagement element 15 positioned between the transmission element 13 and the clutch housing 29 may comprise the engagement element shown in FIG. 6 including the reverse pitch regions 18. In this embodiment, the reverse pitch regions 18 face the transmission element 13 and the smooth surface 49 abuts the clutch housing 29. In a further embodiment, the engagement element 15 having reverse pitch regions 18 which face the transmission element 13 may be formed integrally with the clutch housing 29.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An actuator for operating a friction clutch, comprising:
   a stationary clutch housing including an axially extending hub portion therewithin;
   a transmission element including a pitch region and being rotatably movable about said axially extending hub portion;
   a drive connected to said housing and said transmission element for rotatively moving said transmission element about said axially extending hub portion;
   a release bearing non-rotatably disposed on said axially extending hub portion and axially displaceable away from said clutch housing for disengaging the friction clutch;
   an engagement element disposed for engagement with said transmission element pitch region and a non-rotating counter-surface, said pitch region being configured to define a predetermined axial pitch such that rotative movement of said transmission element by said drive causes said engagement element to displace said release bearing for disengaging the friction clutch; and
   wherein said axial pitch is dimensioned so that said transmission element applies a substantially constant actuating force to said release bearing through said engagement element.

2. An actuator in accordance with claim 1, wherein said axial pitch is dimensioned so that said rotative movement of said transmission element causes said engagement element to move into displacing contact with said release bearing to displace said release bearing by a substantially constant displacement distance.

3. An actuator in accordance with claim 1, wherein said engagement element further comprises a reverse-pitch region defining an axial pitch in a direction of said pitch region of said transmission element.

4. An actuator in accordance with claim 3, wherein said pitch region and said reverse-pitch region each comprises an oblique plane.

5. An actuator in accordance with claim 4, wherein said pitch region and said reverse-pitch region are operatively arranged so that rotation of said pitch region relative to said reverse-pitch region produces said actuating force for displacing said release bearing.

6. An actuator in accordance with claim 3, wherein said pitch region and said reverse-pitch region are operatively arranged so that rotation of said pitch region relative to said reverse-pitch region produces said actuating force for displacing said release bearing.

7. An actuator in accordance with claim 1, wherein said engagement element comprises a ball operatively arranged in force-locked arrangement between said transmission element and said counter-surface for operative movement in said pitch region.

8. An actuator in accordance with claim 1, further comprising a compensation spring engaging said transmission element for reducing an actuating force applied by said transmission element to said release bearing to disengage the friction clutch.

9. An actuator in accordance with claim 1, wherein said transmission element comprises a gear connected to and rotatively moved by operation of said drive.

10. An actuator in accordance with claim 1, wherein said release bearing comprises said counter-surface.

11. An actuator in accordance with claim 1, wherein at least one of said engagement element and said transmission element are disposed within said clutch housing.

12. An actuator in accordance with claim 1, further comprising a gearing disposed between said drive and said transmission element for transmitting operating power to and for rotatively moving said transmission element, said gearing being axially displaceable with said transmission element for effecting through said transmission element said displacement of said bearing to disengage the friction clutch.

13. An actuator in accordance with claim 12, wherein said engagement element is disposed on a side of said gearing facing said clutch housing.

14. An actuator in accordance with claim 13, wherein said engagement element is disposed so as to abut said clutch housing.

15. An actuator in accordance with claim 12, wherein said gearing comprises a helical toothing.

16. An actuator in accordance with claim 1, wherein said engagement element is integral with said clutch housing and said engagement element is disposed within the clutch housing.

17. An actuator in accordance with claim 1, wherein said engagement element is the sole element between said transmission element and said counter-surface.

* * * * *